United States Patent [19]

Hold et al.

[11] 4,007,522

[45] Feb. 15, 1977

[54] CONTROLLED DEFLECTION ROLL ASSEMBLY

[75] Inventors: Peter Hold, Milford; John Crossley Hinchcliffe, Cheshire, both of Conn.

[73] Assignee: USM Corporation, Boston, Mass.

[22] Filed: May 26, 1976

[21] Appl. No.: 690,052

[52] U.S. Cl. .................... 29/116 AD; 29/113 AD
[51] Int. Cl.² ........................................ B21B 13/02
[58] Field of Search ... 29/116 AD, 113 AD, 116 R, 29/113 R

[56] References Cited

UNITED STATES PATENTS

| 3,119,324 | 1/1964 | Justus | 29/116 AD X |
|---|---|---|---|
| 3,638,292 | 2/1972 | Gaghan | 29/116 AD X |
| 3,833,980 | 9/1974 | Gaghan | 29/116 AD |
| 3,846,883 | 11/1974 | Biondetti | 29/116 AD |
| 3,854,646 | 12/1974 | Dorfel et al. | 29/116 AD |
| 3,879,827 | 4/1975 | Lehmann | 29/116 AD |

FOREIGN PATENTS OR APPLICATIONS 1,070,125   12/1959   Germany ................... 29/116 AD

*Primary Examiner*—Alfred R. Guest
*Attorney, Agent, or Firm*—Donald N. Halgren; Richard B. Megley; Vincent A. White

[57] ABSTRACT

At least one pressure applying member is disposed within a slot extending lengthwise along a stationary shaft about which is journaled an outer roll shell. Slidable spacer blocks also disposed in said slot locate each pressure applying member along the slot and permit each member to slide radially in the slot so as to accurately conform to the internal surface of the roll shell and permit an accurately controllable response by the pressure applying members to any deflection of the shaft.

12 Claims, 3 Drawing Figures

CONTROLLED DEFLECTION ROLL ASSEMBLY

BACKGROUND OF THE INVENTION

1. Field of the Invention

This invention relates to pressure applying rolls and, more particularly, to controlled deflection rolls comprising an inner non-rotative shaft having a roll shell journaled about it, the inner shaft having hydrostatic bearings directed against the inner surface of the roll shell.

2. Prior Art

This invention is generally related to copending U.S. applications, Ser. No. 583,860, filed June 4, 1975 and Ser. No. 658,619, filed Feb. 17, 1976, both being assigned to the assignee of the present invention. The first application discloses an arrangement to externally bend the inner non-rotating shaft of the deflection roll wherein deflection sensors control the amount of bending, the inner shaft bending in a manner to counter any deflection of the roll shell. The latter application discloses toroidally shaped flexible membrane members disposed on the radially outer end of shell supporting members which are themselves disposed in the inner non-rotative shaft so as to press the membrane toward the outer shell. The toroidally shaped membrane provides a conformable hydrostatic bearing acting against the inner surface of the outer shell to uniformly support the outer shell and to reduce or eliminate deflections caused by external loads or to deflect the shell in a predetermined way.

An earlier patent, also assigned to the assignee of the present invention, is U.S. Pat. No. 3,587,152, which involves a controlled deflection roll having one or more radially acting pressure applying pistons. Each piston has a pad on its radially outer end with a curvilinear surface that supports the inner surface of the roll shell with pressurized fluid providing a hydrostatic bearing therebetween.

U.S. Pat. No. 3,846,883 discloses a piston and hydrostatic bearing shoe arrangement for deflection rolls. The shoe is pivotally mounted on the outer end of the piston, the piston being held in a radially slidable relationship with the non-rotating inner shaft.

Another recent U.S. Pat. No. 3,879,827, discloses a roll for a rolling mill wherein isolated arrays of hydrostatic bearings may have a larger bearing force at the middle of the roll shell. A further example of the prior art is shown in U.S. Pat. No. 3,802,044 wherein a piston has a hydrostatic bearing interface with a roll shell, the bearing being tiltable to a slight degree and is fed with pressurized fluid from a servomotor, the piston being floatable within the nonrotative shaft. Foreign prior art includes British Patent No. 641,466 and Canadian Patent No. 976,031 which disclose pressure roller arrangements. U.S. Pat. No. 3,346,924, assigned to the present assignee, discloses a bladder type force applicator, not used, however, for deflection rolls, but for injection molding machines.

It is seen, therefore, that the prior art encompasses a number of approaches to the problem of providing support for a deflectable roll shell, and the like. Much of the prior art is comprised of unduly complicated geometry of their pistons and some of the prior art has the potential disadvantage of being unstable during operating conditions, particularly if large deflections of the roll shell are encountered, which some art would not be able to correct. None of the art teaches the concept of pressurizable membranes disposed radially inwardly of radially movable pistons, the pistons themselves being permitted a longitudinal pivoting motion in a slotted stationary shaft.

BRIEF SUMMARY OF THE INVENTION

According to the present invention, a roll shell is journaled about a non-rotative shaft. The shaft contains an arrangement of pistons, the radially outer end of each comprising a hydrostatic bearing pad which supports the roll shell internally. The radially inner end of each piston is disposed upon an inflatable bladder, which receives pressurizable fluid from a source and contains a quantity of the pressurized fluid within the bladder. Some of the pressurized fluid passes through a passageway in the bladder and the piston to lubricate the bearing pad and/or form a hydrostatic bearing. The pistons and their respective inflatable bladders are spaced in a longitudinal channel cut into the portion of the non-rotative shaft facing the portion of the shell to be supported. Blocks are slidingly spaced in the channel between adjacent piston-bladder assemblies, locating and permitting the piston-bladder assemblies to pivot within the channel in the shaft encountered because of any deflection in the shaft created by loading of the roll shell.

BRIEF DESCRIPTION OF THE DRAWINGS

The objects and advantages of the present invention will become more apparent when viewed in conjunction with the following drawings in which.

DESCRIPTION OF THE PREFERRED EMBODIMENTS

Figure 1:
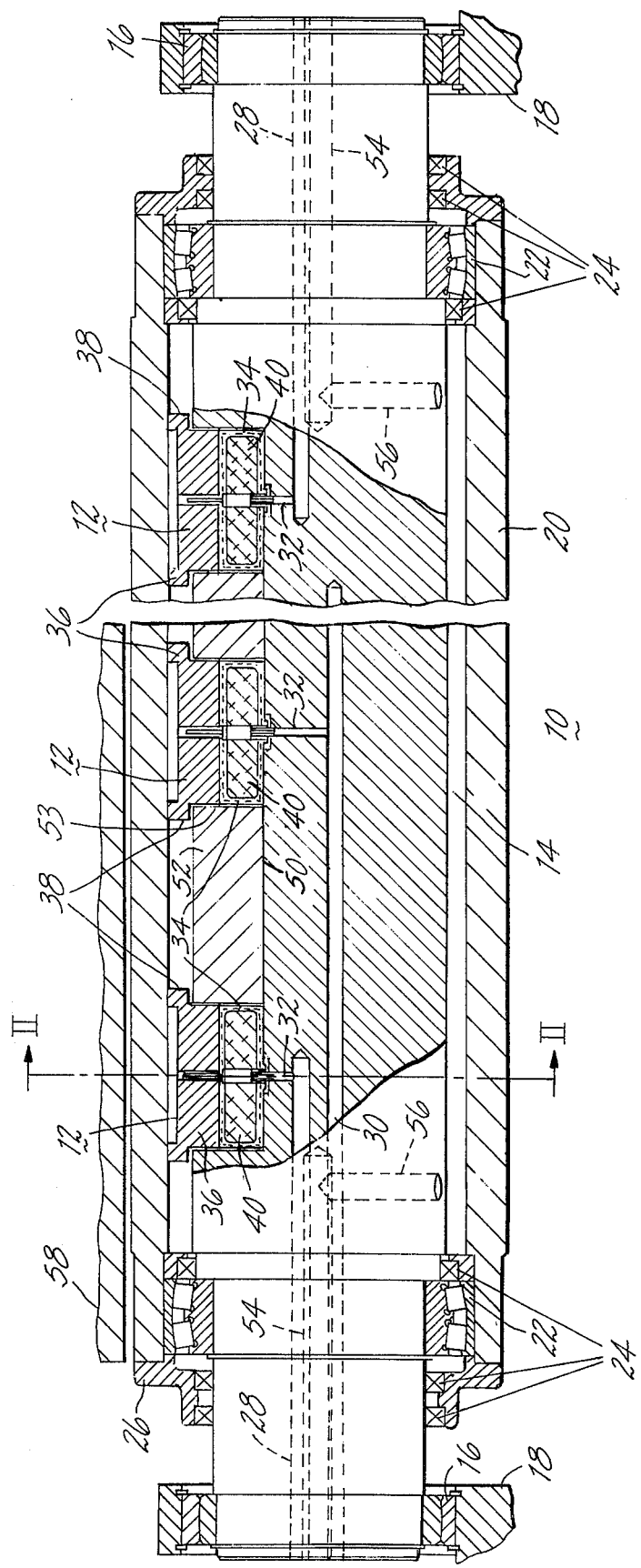
FIG. 1 is a longitudinal sectional view of a roll shell utilizing the hydrostatic piston arrangement of this invention.

Referring to the drawings in detail, and particularly to FIG. 1, there is shown a controlled deflection roll 10 comprising a plurality of hydrostatic piston assemblies 12. The plurality of hydrostatic piston assemblies 12 are disposed for radial movement in a non-rotative, inner shaft 14. The shaft 14 may be of generally circular cross section and is supported on each end by support bearings 16. Each bearing 16 may be held by a roll stand 18 or frame section as shown, or may be carried in a movable member without departing from the scope of the invention.

An outer roll shell 20 is journaled for rotation about the non-rotative inner shaft 14 by support bearings 22 disposed at each end of the shell 20 between the shell and the inner shaft 14. Disposed adjacent each outer shell support bearing 22 are a plurality of ring seals 24 held by a seal retainer member 26.

A plurality of pressurized fluid supply conduits 28 and 30 conduct pressurized fluid from a pressure source, not shown, through generally the middle of the non-rotative shaft 14 to an array of fluid supply passageways 32, each of which leads to a pressurizable bladder 34. Fluid entering the conduits 28 and 30 may have differing pressures, variable according to the desired amount of control of any deflection necessary at any point along the length of the shell 20. Each pressurizable bladder 34 is disposed against the radially inwardly directed end of a piston 36 which comprises each hydrostatic piston assembly 12. Each bladder 34 is pressurizable by fluid entering through its respective fluid supply passageway 32 to expand the bladder to cause radially directed movement of the piston 36 to force a hydrostatic bearing pad 38 disposed on the radially outer end of each piston 36, toward, and against the inner surface of the outer roll shell 20. A reduction of pressure within the bladder 34 would permit the bearing pad 38 to return from its biased position. While only the supply conduits 28 and 30 have been shown, any number of conduits may be provided without departing from the scope of the invention depending only on the extent of variable control desired.

Figure 2:
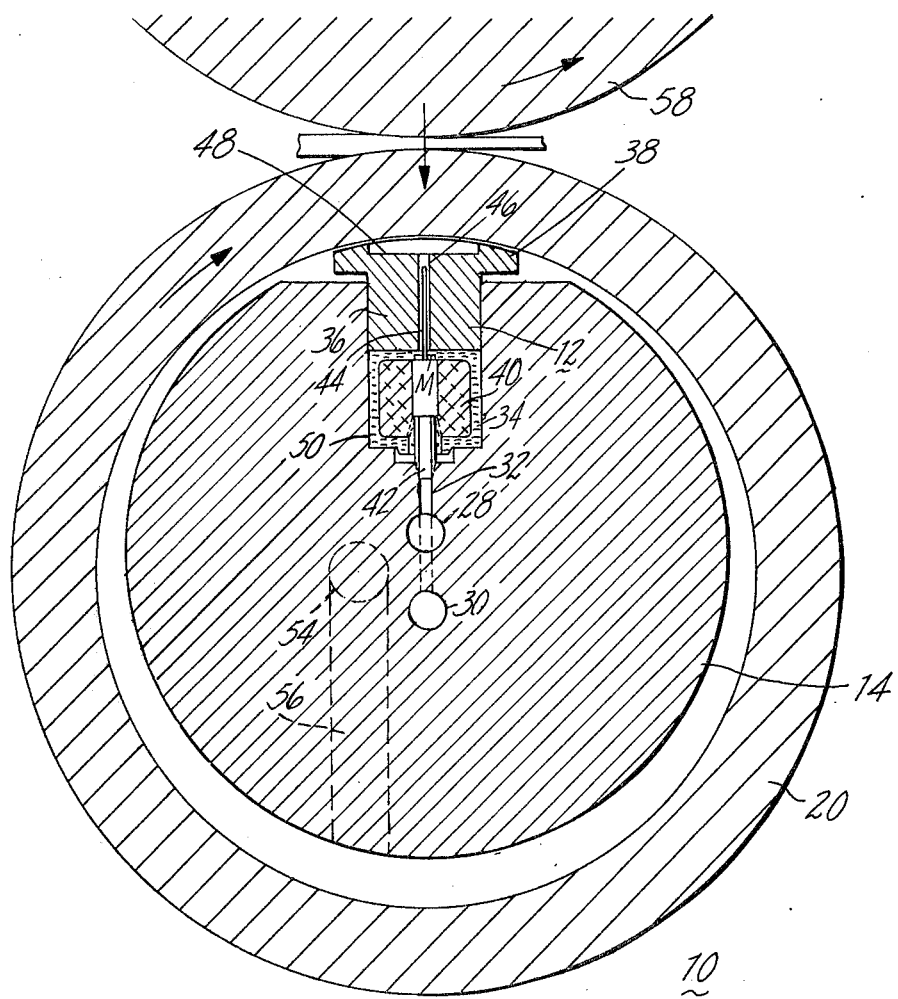
FIG. 2 is a sectional view taken along the lines II—II of FIG. 1.

The bladders 34 are pressurizable, expandable and contractable members constructed from an elastomeric substance, e.g., urethane. Other flexible substances could easily be substituted. Disposed within each bladder 34 is shown a core 40, which may be made from any suitable solid or permeable metal or plastic material, which preferably is voluminous enough to prevent the bladder 34 from collapsing to a flattened state. However, the core could be omitted without seriously affecting the operation of the bladder. The radially inner side only of each core 40 is attached to its respective surface in the bladder 34, which permits the sides, as well as the radially outer end of the bladder 34, to be extended when the bladder is pressurized. A pipe 42, shown in FIG. 2, is threaded through the radially inner end of the bladder 34 and into the bladder core 40. The radially inner end of the pipe 42 is fitted into a fluid supply passageway 32 to direct pressurized fluid to each bladder 34. A restrictor or capillary member 44 is molded through the radially outer surface of the bladder 34 at "M," to receive pressurized fluid from within the bladder 34, the capillary 44 extending partially through a channel 46 in its associated piston 36. The channel 46 extends to a recess 48 within the bearing pad 38 wherein the exiting fluid initiates its lubricating function. The bearing pad 38 is shaped generally as an arcuate segment of a cylinder, which permits frictionless support of the inside of the roll shell 20 to which it conforms.

Each hydrostatic piston assembly 12 is generally rectangular in cross-section and is received in a channel 50 extending lengthwise along the inner non-rotative shaft 14. A spacer block 52 is slidingly disposed within the channel 50 between adjacent piston assemblies 12. There is a slight side clearance, or free space, between each spacer block 52 and its adjacent hydrostatic piston assemblies 12. The sides 53 of the spacer block 52, adjacent the piston assemblies 12, may also be non-parallel with one another or tapered inwardly to permit slight pivotal or arcuate tilting movement of the piston assembly 12. The block 52 may otherwise be made of resilient material permitting a slight yielding when an adjacently disposed hydrostatic piston assembly 12 is applying a side pressure thereon in response to a deflection in the outer roll shell 20.

Figure 3:
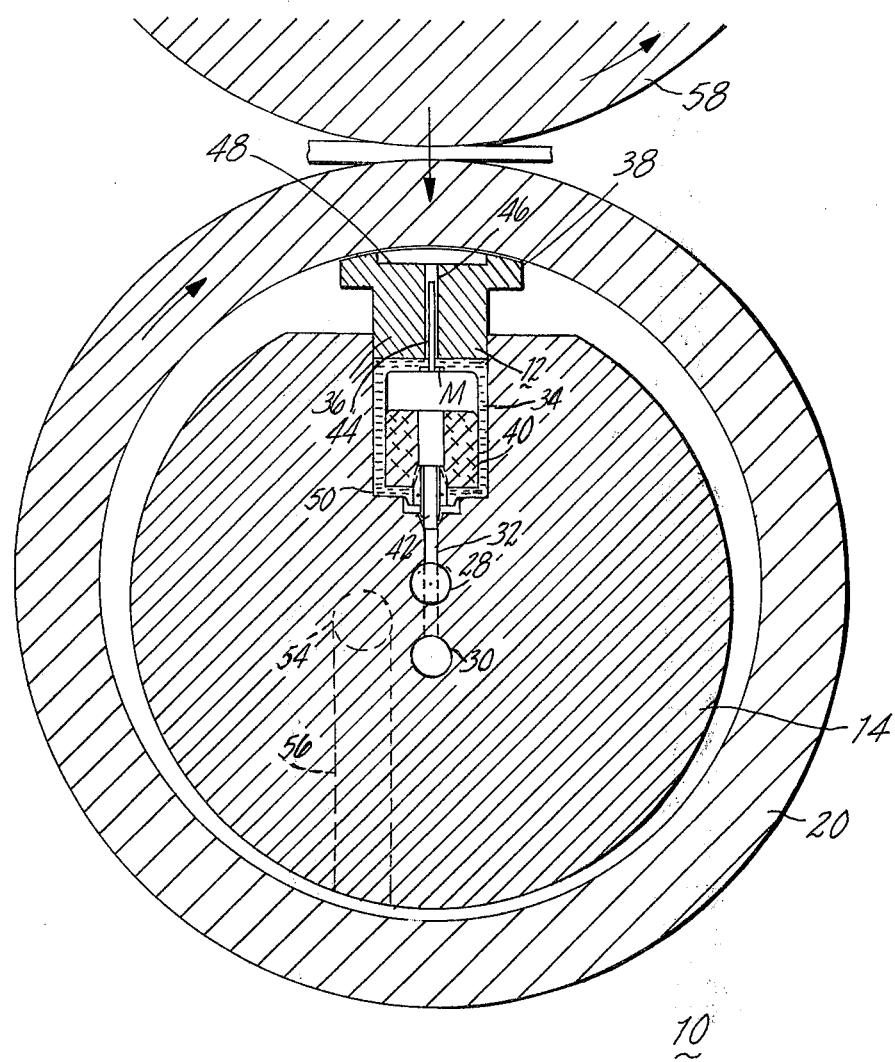
FIG. 3 is a view similar to FIG. 2, showing the piston extended in its cylinder due to expansion of its pressurized bladder.

A drain line 54, having a pick-up channel 56, as shown in FIG. 2, returns the fluid flowing from the pads 38 to the pressure source for recycling the fluid to the hydrostatic piston assemblies 12. In the operation of the roll, the fluid enters the bladders 34, causing them to expand according to the pressure applied by the fluid, the bladders being enlarged, as shown in FIG. 3. The cross-sectional area of the bladder 34 is smaller than the surface area of the hydrostatic bearing pad 38. The resultant force exerted on the bearing pad 38 by the bladder 34 is adapted to be equal and opposite to the resultant force acting on the radially outer end of the piston 36 in order to attain equilibrium. This equilibrium is achieved because the pressurized fluid flows from the inside of the bladder 34 through the restrictor 44 where the pressure is reduced to a level that makes equilibrium possible. At this level, the flow of pressurized fluid, preferably oil, through the restrictor 44 is equal to the flow of fluid over the surfaces of the hydrostatic bearing pad.

Because pressurized fluid is contained in the resilient bladder 34, the reciprocally disposed hydrostatic piston assembly 12 is permitted to tilt or pivot in the longitudinal plane that comprises channel 50, and make it conform with the inside of the rotating outer shell 20 regardless of any deflection of the inner non-rotating shaft 14 in which the hydrostatic piston assembly 12 moves. The deflection of the shaft may be produced by the weight of the roll shell 20 itself, or it may be produced by any material it is bearing, as well as loads due to any pressure rolls 58 which may be acting against the roll shell 20, as also shown in FIG. 2.

Thus it has been shown that a novel mechanism for countering deflections in roll shells has been invented, whereby pistons of generally rectangular cross-sectional shape, disposed on inflatable bladders, can tilt in a longitudinal channel in a non-rotating shaft to produce a counterdeflective force in a work loaded outer rotative shell which, under most desirable circumstances, should be operating in a nondeflected state.

Though the invention has been described with a certain degree of particularity, it is intended to be exemplary only.

We claim:
1. A controlled deflection roll comprising:
   a shaft having a support arrangement near each end thereof;
   a shell roll journaled for rotation about said shaft, said shell roll and said shaft having a radial space therebetween;
   at least one piston mounted in a longitudinally extending slot in said shaft, said slot permitting radial movement of said piston toward the inner surface of the shell roll;
   an expandable member in said shaft adjacent the inner end of said piston; and
   a hydrostatic bearing shoe disposed upon the outer end of said piston extending into said space and facing the inner surface of said shell roll;
   said slot permitting said piston to pivot as it moves in the radial direction while preventing movement of the piston in a circumferential direction with respect to said shaft.

2. A controlled deflection roll as recited in claim 1, wherein said expandable member comprises an inflatable bladder for receiving pressurizable fluid.

3. A controlled deflection roll as recited in claim 1, wherein each of said radially movable pistons and said pressurizable members are connected to their own pressurizable fluid sources.

4. A controlled deflection roll as recited in claim 1, wherein spacer blocks are disposed in said longitudinally directed slot between adjacent radially movable pistons, said spacer blocks being slidable with respect to said longitudinally directed slot.

5. A controlled deflection roll as recited in claim 2, wherein said bladder is at least partially filled with a core to maintain the bladder at a minimum size.

6. A controlled deflection roll as recited in claim 4, wherein said spacer blocks are comprised of a resilient material which permits a contraction thereof due to said pressure caused by swinging of said pistons in the axial direction of said shaft.

7. A controlled deflection roll as recited in claim 4, wherein said generally longitudinally directed slot is disposed in only a portion of the length of said shaft, said slot having shoulders at each end thereof.

8. A controlled deflection roll comprising;
 a shaft having a support arrangement near each end thereof;
 a shell roll journaled for rotation about said shaft, said shell roll and said shaft having a radial space therebetween;
 at least one movable piston mounted within a generally longitudinally directed slot in said shaft;
 said piston having a hydrostatic bearing pad on its outer end; said piston being responsive to a pressurized fluid acting upon its inner end;
 said piston having a channel therethrough with a fluid flow restrictor near its radially outer end to permit an escape of some pressurized fluid, while permitting said pressurized fluid to radially displace said movable piston; and
 at least one spacer block disposed between adjacent pistons and being slightly slidable in said longitudinal slot; said spacer block having free space on its sides, permitting pivoting of said piston in said slot so as to allow said hydrostatic bearing pad to conform to any deflection of the shaft within said shell roll.

9. A controlled deflection roll as recited in claim 8, wherein said pressurized fluid acting upon the inner end of said piston is contained in an inflatable bladder member.

10. A controlled deflection roll as recited in claim 9, wherein said inflatable bladder member is in fluid communication with said restrictor.

11. A controlled deflection roll as recited in claim 9, wherein a regulatable pressurized fluid is supplied to each piston.

12. A controlled deflection roll as recited in claim 9, wherein the upstanding walls of said spacer blocks are tapered toward one another providing clearance, permitting said piston to pivot during deflection of said shaft.

* * * * *